United States Patent Office 3,218,123
Patented Nov. 16, 1965

3,218,123
RECOVERY OF STRONTIUM VALUES FROM SULFATE-CONTAINING WASTE SOLUTIONS
Wallace Davis, Jr., and William C. Yee, Oak Ridge, Tenn., assignors to the United States of America as represented by the United States Atomic Energy Commission
No Drawing. Filed Nov. 23, 1962, Ser. No. 239,848
3 Claims. (Cl. 23—102)

Our invention relates to the recovery of strontium values from radioactive waste solutions.

Strontium 90, a long-lived product of nuclear fission, is useful for numerous radiation-source applications. Because of the characteristic radiation emitted (0.61 mev. beta, no gamma), this isotope is suitable for use in medicine and industry for such applications as beta-ray therapy and thickness gauging. Its long half-life (28 years) and chemical stability in the form of compounds such as strontium titanate make strontium 90 particularly attractive as a source of power for thermoelectric generators in space vehicles or remote weather stations. These applications require large quantities of strontium 90 with a high degree of purity.

The usual source of strontium 90 is an aqueous nitric acid waste solution obtained in chemical reprocessing of irradiated nuclear reactor fuel elements. Chemical reprocessing generally comprises dissolving the fuel elements in nitric acid and selectively extracting uranium and plutonium values with an organic solvent. The bulk of the fission products, including strontium 90, are left in the aqueous phase, along with process additives and inert components of the fuel. The composition of the resulting highly radioavtive waste solution varies with the type of fuel, the irradiation history of the fuel and the reprocessing method. One of the major sources of strontium 90 is a sulfate-containing solution produced in the reprocessing of irradiated aluminum-clad natural uranium fuel elements by one embodiment of the solvent extraction process commonly referred to as the "Purex" process. The composition of typical solutions of this type may be seen by reference to the following table.

TABLE I.—COMPOSITION OF SULFATE-CONTAINING "PUREX" WASTE SOLUTIONS

| Constituent | Concentration, molar | Concentration, grams/liter |
|---|---|---|
| $HNO_3$ | 4.0–6.0 | |
| $Fe^{+3}$ | 0.5 | |
| $Na^+$ | 0.5–0.6 | |
| $Al^{+3}$ | 0.1 | |
| $Cr^{+3}$ | 0.01 | |
| $Ni^{+2}$ | 0.005–0.01 | |
| $UO_2^{+2}$ | 0.002–0.01 | |
| $SO_4^{-2}$ | 0.75–1.0 | |
| $PO_4^{-3}$ | 0.01 (as precipitate) | |
| Si | 0.02–0.2 (as precipitate) | |
| Ce | | 0.47. |
| Zr-Nb | | 0.60 (as precipitate). |
| Ru | | 0.29. |
| Cs | | 0.37. |
| Rare Earths | | 0.83. |
| Sr | | 0.17. |
| Y | | 0.08. |
| Pu | | 0.0035. |

Large quantities of this type solution have been produced and are currently in storage. It may be seen from the above that the concentration of strontium is quite low compared to the amount of non-radioactive constituents such as sulfate, iron, sodium, chromium and aluminum in the solution.

Various methods have been used for separation and recovery of strontium 90 from waste solutions, but disadvantages have been presented, particularly for large-scale operation. Selective solvent extraction with di(2-ethylhexyl)phosphoric acid in a hydrocarbon diluent has been successfully employed, but large amounts of expensive reagents are required in this process. In addition, this process requires the addition of tartrate to the aqueous phase as a complexing agent, and this organic material may present difficulties in subsequent disposal treatments such as calcination. Strontium recovery has been effected for some types of solutions by precipitation according to the process of U.S. Patent No. 3,010,788, issued November 21, 1961, to Eugen Glueckauf. In this process the nitric acid concentration of the solution is increased to at least 18 molar and the solution is heated to a temperature of 50° C. to 75° C. Strontium is precipitated, while aluminum and other contaiminants remain in solution. We have found, however, that this process is ineffective for sulfate-containing solutions of the composition given above. For this type solution over 90 percent of the strontium is precipitated, but over 80 percent of the iron, aluminum and chromium precipitate as sulfates along with strontium, resulting in poor separation of strontium. Removal of the sulfate from solution prior to precipitation of strontium is thus desired.

It is, therefore, an object of our invention to provide a method of removing sulfate ions from nitric-acid fission-product solutions produced in chemical reprocessing of irradiated nuclear reactor fuel.

Another object is to provide a method of removing sulfate ions from a nitric acid solution containing the same, together with strontium values and values of other metals which precipitate as sulfates in the precipitation of strontium nitrate.

Another object is to provide a method of removing sulfate ions from a nitric acid solution containing the same, together with strontium values, iron values, aluminum values and chromium values.

Another object is to provide a method of recovering strontium values from said solutions.

Other objects and advantages of our invention will be apparent from the following detailed description and claims appended hereto.

In accordance with our invention sulfate ions are selectively precipitated from nitric acid solution containing strontium values and values of other metals which precipitate as sulfates in the precipitation of strontium nitrate by adding a sufficient amount of ferric ions to said solution to provide a stoichiometric excess for formation of ferric sulfate, increasing the nitric acid concentration of said solution to a level of about 55 to 60 weight percent, whereby ferric sulfate is selectively precipitated, and separating the ferric sulfate precipitate from the solution. Interfering sulfate is readily removed by this means, and strontium may then be recovered by the method described above, namely, precipitation as strontium nitrate from greater than 18 molar nitric acid solution at a temperature of 50° C. to 75° C.

We have found that ferric sulfate is precipitated in 55 to 60 weight percent nitric acid solution, while strontium remains in solution at this concentration. Selective precipitation of ferric sulfate occurs within a narrow range of acid concentrations. At concentrations below 55 weight percent substantial amounts of sulfate remain in solution, and above 60 weight percent increasing amounts of strontium are precipitated along with the ferric sulfate.

The method of our invention is broadly applicable to the removal of sulfate ion from strontium-bearing nitric acid solutions containing sulfate and any metal which precipitates as a sulfate in the precipitation of strontium nitrate. The sulfate-precipitating metals normally present in a strontium-bearing waste solution are chiefly aluminum and iron, typically at a concentration of 0.1 to 0.5 molar each, along with a lesser amount of chromium, e.g., 0.005 to 0.1 molar. The solution may also contain other divalent and trivalent metal cations which would precipitate as sulfates in the precipitation of strontium nitrate unless sulfate is removed. The concentration of iron and aluminum or other sulfate-precipitating metals and the concentration of sulfate in the starting solution are not critical to the method of our invention. In general the solution may contain up to about 1 molar of any one of these constituents and a total cation concentration of up to about 3 molar in addition to the nitric acid concentration, which is normally about 4 to 6 molar. The sulfate concentration of sulfate-containing waste solutions is normally higher than the iron concentration so that additional iron is required to provide an excess for precipitation of ferric sulfate. The radioactive constituents of sulfate-containing waste solutions generally comprise, in addition to strontium 90 at a level of about 0.1 to 1.0 gram per liter, long-lived radioisotopes of cerium, zirconium, niobium, ruthenium, cesium, other rare earths, yttrium, uranium and plutonium, all at concentrations below one gram per liter. The relative proportions of these constituents, which vary with the decay time and processing history of the solution, are not critical to our invention.

Ferric ions are supplied to the sulfate-containing waste solution in an amount in excess of the stoichiometric quantity for formation of ferric sulfate. An excess is required for substantially complete precipitation of sulfate, and about a twofold excess is preferred. The iron values already in the waste solution are normally in the ferric state owing to the oxidizing conditions of the solution. The amount of additive ferric ions required is decreased to this extent. Ferric ions are preferably supplied in the form of hydrous ferric oxide prepared by the addition of ammonium hydroxide to an aqueous solution of hydrated ferric nitrate, $Fe(NO_3)_3 \cdot 9H_2O$. The reactivity of hydrous ferric oxide in forming the sulfate precipitate is substantially greater when the precipitated ferric oxide is freshly separated from solution. For this reason it is preferred to introduce the hydrous ferric oxide to the sulfate-containing solution within two hours following removal of the ferric oxide precipitate from its preparatory solution or prior to substantial dehydration of this material. The use of partially dehydrated hydrous ferric oxide may retard establishment of equilibrium in the subsequent sulfate precipitation reaction. The soluble ferric salt, $Fe(NO_3)_3 \cdot 9H_2O$, may also be employed, but this salt contains a high proportion of water of hydration and its use results in detrimental dilution of the solution.

Ferric sulfate is then precipitated by increasing the nitric acid concentration to about 55 to 60 weight percent. It is preferred to add nitric acid in the "white fuming" form, which has a concentration of 90 to 95 weight percent. The temperature of precipitation is not critical and room temperature may be employed. The bulk of the ferric sulfate precipitate is formed within a period of 12 hours. In order to ensure complete precipitation, however, it is preferred to agitate the precipitate-containing solution for a period of at least 24 hours.

The ferric sulfate precipitate is separated from the remaining solution. The method of separation is not critical, and conventional filtration may be employed.

Strontium values are then recovered from the sulfate-free solution by the previously known method described above. The concentration of nitric acid is increased to a level of at least 18 molar by further addition of fuming nitric acid or by evaporation, and a strontium nitrate precipitate is formed at a temperature of 50° C. to 75° C. The strontium-bearing precipitate is then separated from the solution by conventional filtration.

The strontium-bearing precipitate requires further purification to obtain high-purity strontium 90. The precipitate is normally contaminated with less than one percent each of iron, aluminum and sulfate ions. Removal of these impurities is effected by dissolving the precipitate in water to obtain a solution about 0.5 normal in nitric acid and adsorbing the strontium from this solution onto a cation exchange resin. Conventional ion-exchange techniques may be used in this step. Strong acid type cation exchange resins may be employed, and the sulfonated polystyrene divinylbenzene resin available under the trade name "Dowex 50W" is preferred. The adsorbed strontium may be selectively eluted with a suitable strontium chelating agent such as 1.2 molar ammonium α-hydroxyisobutyrate at pH 6.0 or 0.13 molar sodium ethylenediamine tetra-acetic acid at pH 6.0. The strontium values are then converted to the compound form desired for radiation-source applications.

Our invention is further illustrated by the following specific example.

*Example*

A simulated "Purex" waste solution of the following composition was prepared: 6.1 M $NO_3^-$, 5.6 M $H^+$, 1.0 M $SO_4^{-2}$, 0.6 M. $Na^+$, 0.5 M $Fe^{+3}$, 0.01 M $Cr^{+3}$, 0.01 M $Ni^{+2}$ and 0.002 M $Sr^{+2}$. Radioactive strontium 85 was provided at a tracer level. To 100 milliliters of this solution 90 grams of freshly precipitated $Fe_2O_3 \cdot XH_2O$ suspended in a small volume of water was added with continuous stirring over a 24-hour period. Sufficient white fuming nitric acid was then added to provide a nitric acid concentration of 59 weight percent. The resulting precipitate-containing slurry was stirred for 48 hours to allow the system to reach equilibrium. The precipitate was then filtered on a fritted glass filter. The remaining solution was evaporated by heating to a temperature of 140° C., leaving a residue. The residue was dissolved in dilute nitric acid, and sufficient white fuming nitric acid was added to provided a nitric acid concentration of 86 weight percent. The resulting solution was stirred for 12 hours at 70° C. to precipitate strontium nitrate. The strontium nitrate precipitate was removed by filtration and dissolved in 30 milliliters of 1 N nitric acid solution. Chemical and radiochemical analyses were performed on the filtrates obtained in each precipitation step and on the strontium nitrate precipitate. Strontium, sulfate, ferric ion, aluminum and sodium were determined. The results obtained may be seen by reference to the following table.

TABLE II.—RECOVERY OF STRONTIUM FROM SULFATE-CONTAINING NITRIC ACID SOLUTION

| Material Analyzed | Strontium-$Sr^{85}$ tracer, counts/min. | $SO_4^{-2}$ | $Fe^{+3}$ | $Al^{+3}$ | $Na^+$ |
|---|---|---|---|---|---|
| Starting solution (total constituents in 100 ml.) | 2.9×10⁵ | 9.49 g. | 2.93 g. | 0.30 g. | 1.43 g. |
| Filtrate from first precipitation (percent of original ions remaining) | 99.9 | 7 | 290 | 55 | 83 |
| Filtrate from second precipitation (percent of original ions remaining) | 20–25 | 7 | 130 | 55 | 70 |
| Strontium nitrate precipitate (percent of original ions) | 75–80 | 0.1 | 0.5 | 0.3 | 0.2 |

It may be seen from the above table that the bulk of the sulfate was removed by precipitation as ferric sulfate and that contamination of the product strontium nitrate precipitate was minimized. Less than one per cent each of the iron, aluminum and sodium precipitated with strontium. In the absence of sulfate removal, about 80 percent or more of these metals would be precipitated along with strontium nitrate.

The above example is merely illustrative and is not to be understood as limiting the scope of our invention, which is limited only as indicated by the appended claims. It is also to be understood that variations in apparatus and procedure may be employed by one skilled in the art without departing from the scope of our invention.

Having thus described our invention, we claim:

1. In the method of recovering strontium values from a nitric acid fission product solution containing the same, together with sulfate ions and ions of at least one metal in the group consisting of iron, aluminum and chromium which comprises precipitating said strontium values as strontium nitrate at a nitric acid concentration of at least about 18 molar and separating the resulting precipitate from the remaining solution, the improvement which comprises adding a sufficient amount of ferric ions to said solution to provide a stoichiometric excess for formation of ferric sulfate, increasing the nitric acid concentration of the resulting solution to about 55 to 60 weight percent whereby ferric sulfate is precipitated and separating the resulting precipitate from the remaining solution prior to precipitating said strontium nitrate.

2. The method of clam 1 wherein sufficient ferric ions are added to said solution to provide about a twofold excess of stoichiometric for formation of ferric sulfate.

3. The method of claim 1 wherein the resulting solution after the precipitation of ferric sulfate is heated to a temperature of about 50° C. to about 75° C. whereby strontium nitrate is precipitated.

References Cited by the Examiner

UNITED STATES PATENTS 2,158,162 5/1939 De Garmo _____ 23—102
3,010,788 11/1961 Glueckauf _____ 23—102

FOREIGN PATENTS 402,056 9/1924 Germany.

MAURICE A. BRINDISI, *Primary Examiner.*